March 11, 1924.
H. L. BAKER
MACHINE FOR TRIMMING SOLID TIRES
Filed April 23, 1921
1,486,474
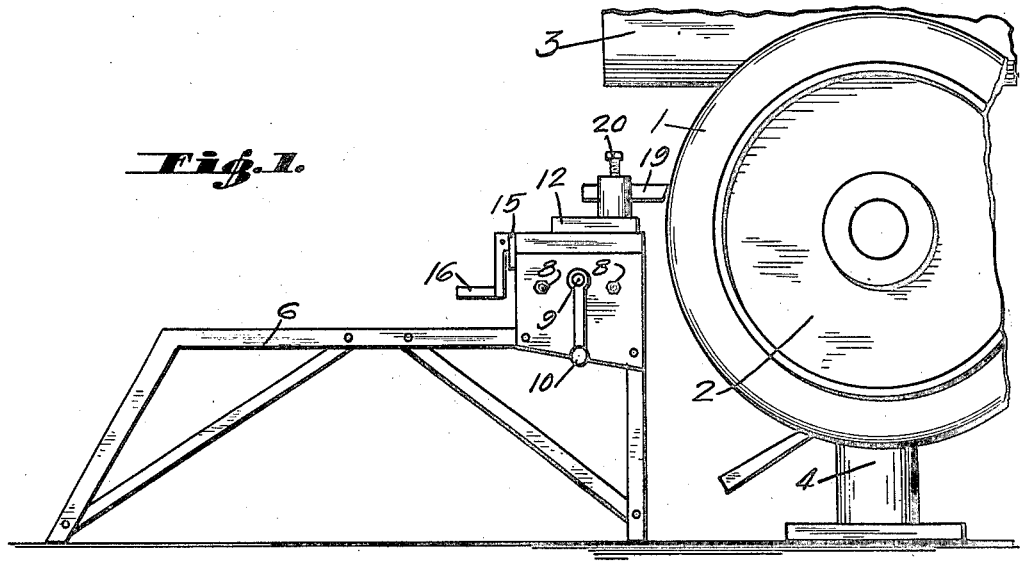
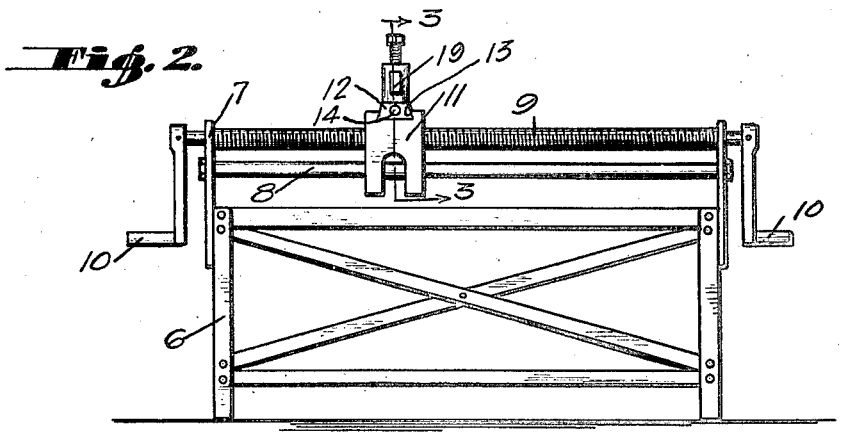
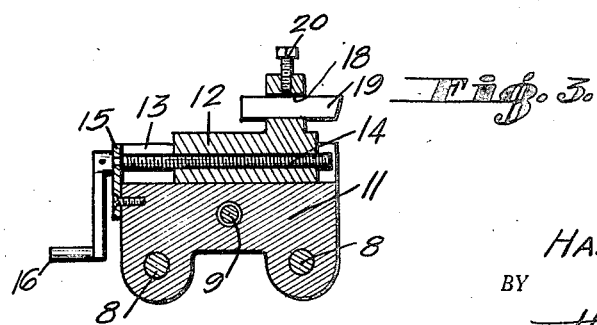
INVENTOR.
HARRY L. BAKER
BY
Hazard & Miller
ATTORNEYS Patented Mar. 11, 1924.

1,486,474

UNITED STATES PATENT OFFICE.

HARRY L. BAKER, OF LOS ANGELES, CALIFORNIA.

MACHINE FOR TRIMMING SOLID TIRES.

Application filed April 23, 1921. Serial No. 464,060.

*To all whom it may concern:*

Be it known that I, HARRY L. BAKER, a citizen of the United States, residing at Los Angeles, in the county of Los Angeles and State of California, have invented new and useful Improvements in Machines for Trimming Solid Tires, of which the following is a specification.

This invention is an apparatus adapted to trim solid tires, such as are employed upon the wheels of motor trucks, said trimming mechanism providing ready means for straightening tires which have been unevenly worn.

The invention contemplates the provision of a frame carrying a movable trimming blade which is adapted to be brought into engagement with the wheel of a truck which has been jacked up so as to permit of rotation of said wheel, it being understood that the trimming blade functioning in connection with the rotating wheel will trim the tire of the wheel to an even surface.

The invention will be readily understood from the following description of the accompanying drawings, in which:

Figure 1 is a side elevation of the device constructed in accordance with the invention, and showing the same in operation.

Fig. 2 is an end view of the apparatus.

Fig. 3 is a detail section on the line 3—3 of Fig. 2.

The improved trimming apparatus may be employed in connection with the tires 1 of wheels 2 and a usual motor truck 3. In operation the wheels of the truck are elevated as by a usual jack 4 in order that said wheels may be freely rotated, and the apparatus forming the trimming means is then positioned adjacent the rotating wheels so that the trimming blade carried by the frame of the apparatus may engage the tread of the tire of a wheel for trimming the same to an even surface.

The trimming apparatus includes a frame 6 provided with end bearing plates 7 which may be connected by guide rods 8. A threaded rod 9 extends across the frame and is journaled in plate 7 with suitable crank handles 10 upon the ends of the rod for turning the same.

A carriage 11 has rod 9 threaded through the same so as to transversely shift the carriage through rotation of the rod, and the guide rods 8 also extend through the carriage in order to support and position the same during its transverse shifting.

A tool holder 12 is mounted in a guideway 13 upon carriage 11 so as to be shifted back and forth at right angles to threaded rod 9, and said tool holder may be actuated by a threaded rod 14 threaded through the holder and journaled in a plate 15 carried by carriage 11. This threaded rod may be provided with a suitable crank handle 16 for rotating the same to adjust the tool holder back and forth. The tool holder is provided with a suitable recess 18 adapted to receive a trimming blade 19 which may be secured in adjusted positions by means of a set bolt 20.

The trimming blade 19 is positioned so that its cutting edge extends beyond the carriage and the frame supporting the same with said cutting edge engaging the periphery of a tire 1. It will be understood that the cutting blade may be adjusted by turning crank handles 10 and crank handle 16. The wheel upon which the tire is mounted is then rotated, and the handles 16 are turned from moving the cutting blade back and forth across the periphery of the tire so as to trim the same to an even surface.

Various changes may be made without departing from the spirit of the invention as claimed.

What is claimed is:

1. A machine for trimming solid tires comprising a frame, bearing plates secured to the ends of the frame, a plurality of rods rigidly connecting the bearing plates, a carriage slidable on the rods, a screw threaded shaft journaled in the bearing plates and threadedly engaging the carriage, cranks on the ends of the shaft, a tool holder having a tongue-and-groove connection with the carriage for sliding movement thereon, a screw threaded rod engaging the tool holder, a bearing plate secured to the carriage and rotatably supporting the rod, an operating crank fixed to one end of the rod, an extension formed on the tool holder having a tool receiving recess formed therein, and means for locking the tool within the recess.

2. A machine for trimming solid tires comprising spaced bearing plates, rods secured to and spanning the space between the bearing plates, a carriage slidably mounted on the rods, a screw threaded shaft journaled in the bearing plates and threadedly engaging the carriage, said shaft and rods being arranged in substantially triangular formation, and a tool holder adjustably mounted on the carriage.

3. A machine for trimming solid tires comprising spaced bearing plates, rods secured to and spanning the space between the bearing plates, a carriage slidably mounted on the rods, a screw-threaded shaft journaled in the bearing plates and threadedly engaging the carriage, and a tool holder mounted on the carriage.

4. A machine for trimming solid tires comprising spaced bearing members, elements secured to and spanning the space between the bearing members, a carriage slidably mounted on the elements, a screw threaded shaft journaled in the bearing members and threadedly engaging the carriage, and a tool holder mounted on the carriage.

In testimony whereof I have signed my name to this specification.

H. L. BAKER.